United States Patent [19]
Blecherman

[11] Patent Number: 4,509,616
[45] Date of Patent: Apr. 9, 1985

[54] ACOUSTICAL LINERS

[75] Inventor: Sol S. Blecherman, Newington, Conn.

[73] Assignee: United Technologies Corporation, Hartford, Conn.

[21] Appl. No.: 490,950

[22] Filed: May 2, 1983

[51] Int. Cl.³ .............................................. B64D 33/02
[52] U.S. Cl. .................................... 181/214; 181/286; 181/292; 423/43; 423/120; 423/116
[58] Field of Search ............... 181/292, 290, 293, 291, 181/288, 284, 213, 214; 428/119, 120, 116, 43

[56] References Cited
U.S. PATENT DOCUMENTS 3,821,999  7/1974  Guess et al. ........................ 428/116
3,998,014 12/1976  Bartels et al. ......................... 428/43
4,001,473  1/1977  Cook .................................. 181/292

Primary Examiner—John Gonzales
Assistant Examiner—Brian W. Brown
Attorney, Agent, or Firm—Norman Friedland

[57] ABSTRACT

An annular groove formed on the inner surface of the porous sheet of an acoustical aircraft or jet engine liner spaced from the front edge and adjacent to the adhesive bonding material serves to prevent dislodgement of the entire porous sheet upon an impending peeling of the porous sheet. The groove also serves as a circuitous path for cracks propagating upstream from a fault manifested downstream therefrom.

1 Claim, 5 Drawing Figures

ACOUSTICAL LINERS

DESCRIPTION

1. Technical Field

This invention relates to acoustic material and particularly the acoustical liners that are utilized on aircraft gas turbine engines and aircraft components.

2. Background Art

As is well known, acoustical liners are formed by sandwiching honeycomb material between a hard sheet and a perforated sheet. Typically, the perforated sheet is formed by drilling or forming a plurality of holes in a given pattern depending on the acoustic characteristics of the environment. These holes are adjacent the grazing flow and the acoustical energy is dissipated by virtue of the liner construction.

The perforated liner is typically adhesively bonded to the surface of the honeycomb and its supporting structure. Because of the forces to which this sheet is constantly subjected, by virtue of the vibrations and air load encountered by the air flowing over the liner, there is a tendency of the sheet to separate completely from its supporting structure.

I have found that I can obviate this problem by including a circumferential groove in the outer diameter of the perforated sheet at the juncture where the perforated sheet extends beyond the honeycomb. In liners that incorporate front mounting flanges, this preferred location would be in the flange at some point spaced from the front end. The adhesive joining the perforated sheet to the liner should be controlled as to viscosity and amount to allow the adhesive to migrate into the groove without filling the complete cavity.

DISCLOSURE OF INVENTION

An object of this invention is to provide an improved liner construction adapted for engine and aircraft application. A feature of this invention is to include a circumferential groove judiciously located to control peeling and crack propagation.

Other features and advantages will be apparent from the specification and claims and from the accompanying drawings which illustrate an embodiment of the invention.

BEST MODE FOR CARRYING OUT THE INVENTION

In its preferred embodiment the liner is configured to fit on the inner diameter of a cylinder as for example the inlet duct of a gas turbine engine. However, it is to be understood that the liner may take on other dimensions, but still be within the scope of this invention.

Figure 1:
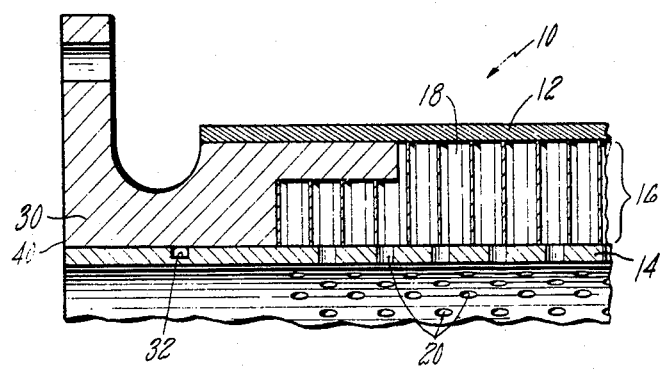
FIG. 1 is a fragmentary view in section of the improved liner.

Suffice it to say, as can be seen by referring to FIG. 1 that the acoustical liner generally indicated by reference numeral 10 comprises an inner circumferential hard or solid face sheet 12, a radially spaced outer circumferential perforated face sheet 14 defining an annular space 16. A suitable honeycomb structured member 18 generally fabricated from aluminum or an alloy thereof fits into annular space 16 such that the upper and lower surfaces are contiguous with the hard sheet 12 and perforated face sheet 14 and the cavities formed by the honeycomb structure align in a radial direction with respect to the duct centerline communicating with the radial holes 20 formed on perforated face sheet 14.

A suitable adhesive 21, say AF 163 commercially available from Minnesota Mining and Manufacturing Co., serves to bond the perforated face plate 14 to the inner face of the honeycomb panel 18 and the inner diameter of the front mounting flange 30 which is sandwiched between hard face sheet 12 and perforated face sheet 14 at the forward edge.

Figure 2:
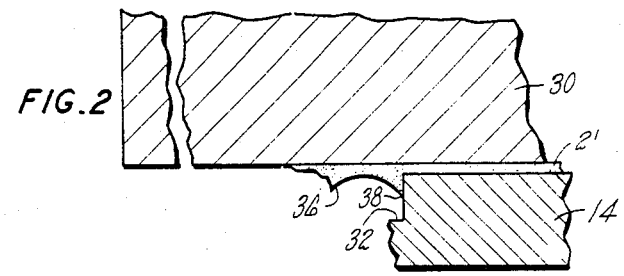
FIG. 2 is an enlarged view of a portion of FIG. 1B showing the effect of the adhesive and groove.

According to this invention circumferential groove 32 is formed in the outer diameter of the perforated face sheet 14 intermediate to the end of flange 30 and the forward edge of the honeycomb structure 18 and the groove is oriented with respect to the direction of grazing flow to be lateral thereto. The characteristics of the adhesive 21 is such that upon its application sufficient quantity is used so that a portion thereof flows in groove 32 as best seen in FIGS. 2 and 3.

By allowing just sufficient glue to enter the groove 32 the glue will have the tendency to become cohesive and form fillets 36 and 38 at the corners of the groove. This has the tendency to add strength at this juncture point.

Figure 1A:
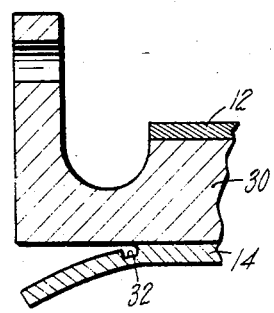
FIG. 1A is a view of a portion of FIG. 1 taken in sequence upon the initiation of a peeling incident.
Figure 1B:
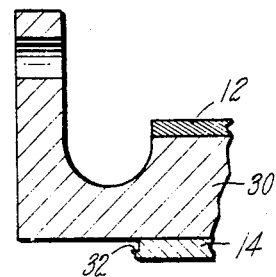
FIG. 1B is a view of a portion of FIG. 1 in sequence upon the breaking of the edge of the perforated sheet after the initiation of a peeling incident.

Thus, should the perforated sheet tend to peel as shown in FIG. 1A, the perforated sheet 14 would snap off at the groove since it is at the weakest point in the sheet. Because of fillet 38, after the break, there would be less of a tendency of the remaining portion of the perforated sheet to peel.

Figure 3:
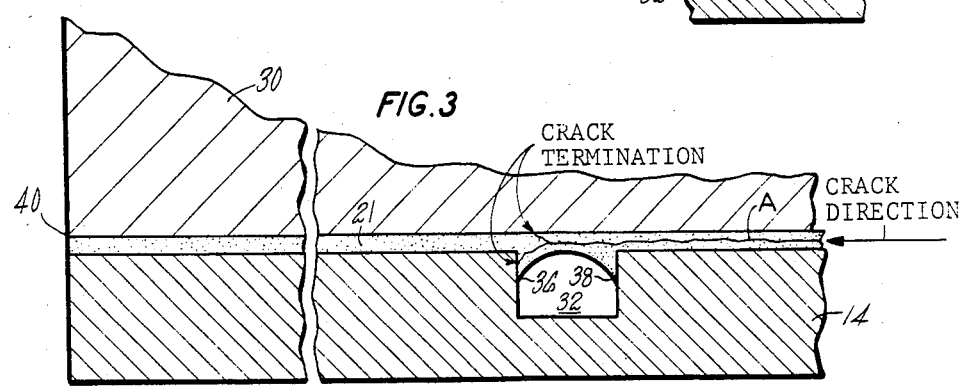
FIG. 3 is an enlarged view of the groove and the adhesive illustrating the propagation of a crack.

As shown in FIG. 3, the invention also affords additional benefit because the adhesive 21 forms a path for the propagated cracks that occur as a result of the vibrating stresses to which the liner is subjected.

In the event a crack occurs from the downstream direction relative to the front face 40 adjacent the flange 30 the crack identified as reference letter A will tend to propagate rearwardly toward the fillets 36 and 38 of the adhesive formed in groove 32. This has the tendency to stop the crack, as shown, and prevent breaking away of the liner or a portion thereof.

While in its preferred embodiment, the invention was described with a front mounting flange, the invention also contemplates other mounting techniques. However, it is contemplated that the groove will be formed at a location where peeling is apt to start and would be adjacent a surface that is contiguous and continues with the perforated face sheet and in the bonded surface.

It should be understood that the invention is not limited to the particular embodiments shown and described herein, but that various changes and modifications may be made without departing from the spirit and scope of this novel concept as defined by the following claims.

I claim:

1. For an acoustical liner, having a cylindrical porous sheet, a spaced concentric hard nonporous sheet and a concentric honeycomb material sandwiched between said porous sheet and said hard nonporous sheet, means for preventing separation of said porous sheet, flange means for mounting said liner adjacent the inner surface, of a duct carrying air so that the grazing flow is adjacent said porous sheet, said porous sheet extending axially from said honeycomb material and having a contiguous surface in contact with a coplanar surface formed on said flange means, adhesive means between said porous sheet and said coplanar surface, the improvement comprising a groove lateral to the flow of air spaced from the front edge of said porous sheet formed in said contiguous surface facing said adhesive means whereby said groove provides a weakened joint for breaking off the front portion of said porous sheet in the event of peeling thereof to avoid the entire sheet from peeling and separating from the remaining portion of said acoustical liner and said means for preventing separation includes a fillet formed adjacent the side walls of said grooves formed by the adhesive of said adhesive means migrating thereto upon assembly of said porous sheet.

* * * * *